United States Patent [19]

Parramore

[11] 4,266,489
[45] May 12, 1981

[54] DOUBLE CROP PLANTER, SPRAYER AND TOPPER

[76] Inventor: Emmett W. Parramore, Rte. 1, Coolidge, Ga. 31738

[21] Appl. No.: 116,493

[22] Filed: Jan. 29, 1980

[51] Int. Cl.³ .......................... A01C 19/00; A01C 5/08
[52] U.S. Cl. ............................................. 111/1; 56/51;
   56/DIG. 5; 111/8; 111/52; 111/73; 180/900
[58] Field of Search ................................. 111/1, 6–7,
   111/8–13, 52, 73, 81; 56/51, 53, 56, DIG. 5;
   47/1.41; 180/900; 280/456, 456 A; 172/484

[56] References Cited

U.S. PATENT DOCUMENTS

| | | | |
|---|---|---|---|
| 2,357,760 | 9/1944 | Peacock | 111/73 |
| 2,556,072 | 6/1951 | Dewey | 111/1 |
| 2,619,361 | 11/1952 | Connors et al. | 111/52 X |
| 2,628,128 | 2/1953 | Rhodeen | 180/900 X |
| 3,128,729 | 4/1964 | Henson | 111/1 |
| 3,179,194 | 4/1955 | Hunt | 180/900 X |
| 3,561,539 | 2/1971 | Evans | 172/484 X |
| 4,062,305 | 12/1977 | Stoker | 111/52 X |
| 4,078,626 | 3/1978 | Weichel | 111/1 X |
| 4,124,079 | 11/1978 | Crow | 111/1 X |

FOREIGN PATENT DOCUMENTS 93725  10/1959  Netherlands ........................... 111/1

OTHER PUBLICATIONS

Anon, "Farmcast" *Farm Journal* Feb. 1977, p. 2.
Marley, C. F. "Planter on Combine Speeds Up Double-Cropping" *Farm Journal* Nov. 1977, p. H-2.

*Primary Examiner*—James R. Feyrer
*Attorney, Agent, or Firm*—B. P. Fishburne, Jr.

[57] ABSTRACT

A high ground clearance tractor during one pass through rows of a standing crop, such as corn, opens a small furrow for a second crop, such as beans, plants the second crop, sprays suitable chemicals on the new crop, and trims the tops of the existing or standing crop. A large energy savings is realized compared to using separate machines for the required operations. The machine is particularly useful in regions having a long growing season. Two rows of a second crop can be planted between each adjacent pair of rows of the existing crop.

13 Claims, 4 Drawing Figures

DOUBLE CROP PLANTER, SPRAYER AND TOPPER

BACKGROUND OF THE INVENTION

Double cropping and second row crop planters are known in the prior art. Such machines have not been widely utilized in agriculture mainly because of the extra cost necessitated for construction of a second special planting machine for the second crop and certain inefficiencies which have existed in the prior art machines for this purpose.

Accordingly, the object of this invention is to provide a more efficient and comparatively more economical machine for double crop planting over existing crops which will also enable the farmer to spray the new crop and trim off the tops of the standing crop in a single pass or operation, thus eliminating the need for additional spraying and/or topping machines or for additional passes through fields of crops. Because of the combined capability of the invention, a substantial savings of energy by the farmer is made possible.

More specifically, the present invention has for one of its features a double disc furrow opener which will not drag or clog up during use. A coacting depth gage wheel makes for greater precision in the placement of seed for the second crop and a seed coverer is included behind the furrow opener and gage wheels.

The machine also possesses a unique hinged planter support arm and spring biasing means whereby the planter has greater flexibility because of independent suspension for each planter unit on the machine.

Another feature of the invention is the mounting up front in full view of the tractor operator of a common seed box for all planter units and an adjacent forward seed box loader platform which is easily reached from the back of any seed supply truck.

Another improvement feature of the machine resides in the use of front and rear four point hitches and power lifting cylinders for the planter units and standing crop topping units.

The sprayer boom and individual flexible drop nozzles leading from it are disposed midway between the standing crop rows and direct chemical sprays correctly onto the new crops well in advance of the trimming litter produced by topping the original crop.

The machine is very well balanced by placement of the large chemical tanks above the rear wheels of the high tractor.

Other features and advantages of the invention will become apparent during the course of the following detailed description.

DETAILED DESCRIPTION

Figure 1:
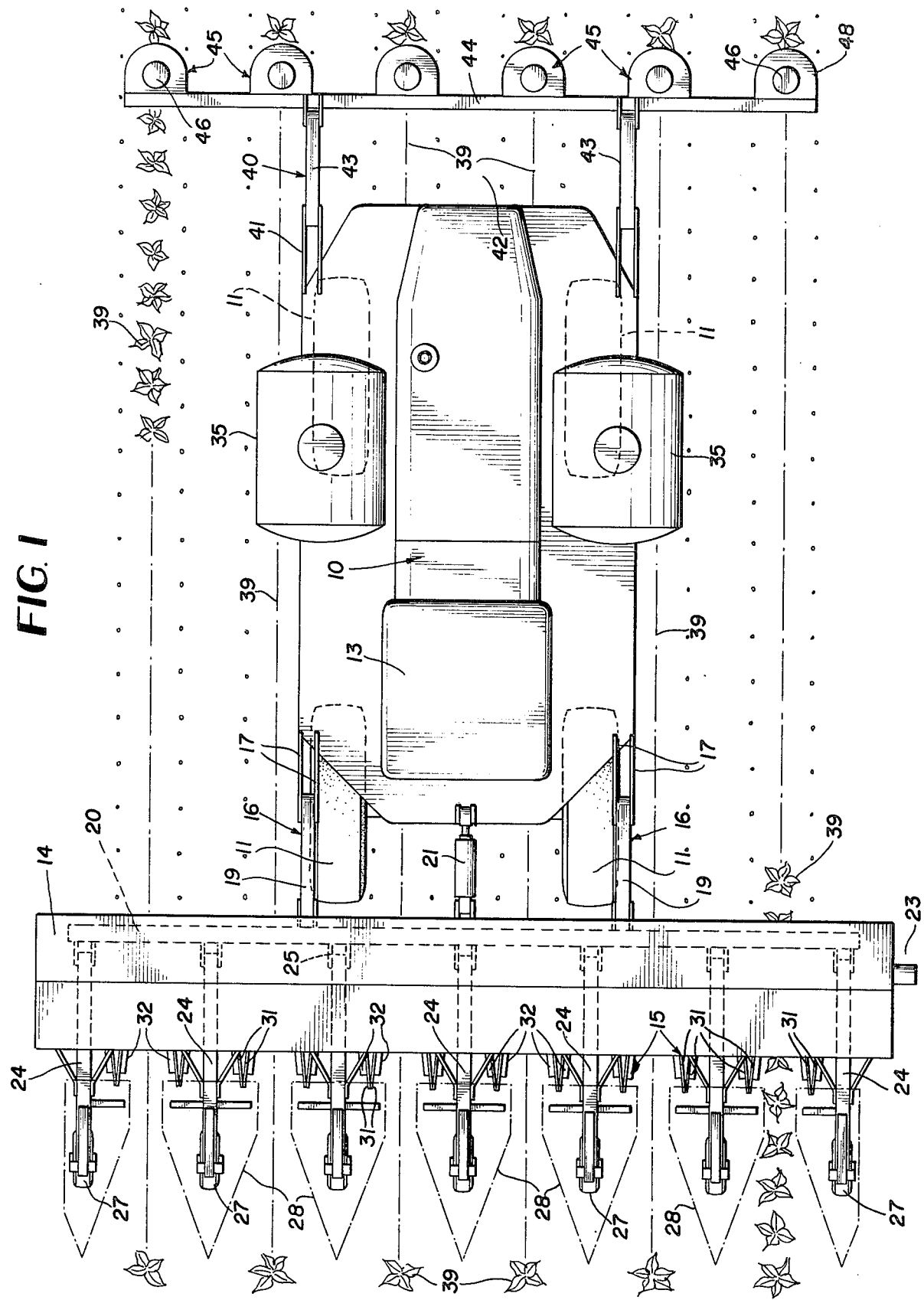
FIG. 1 is a top plan view of a double crop planter, sprayer and topper according to the invention.
Figure 2:
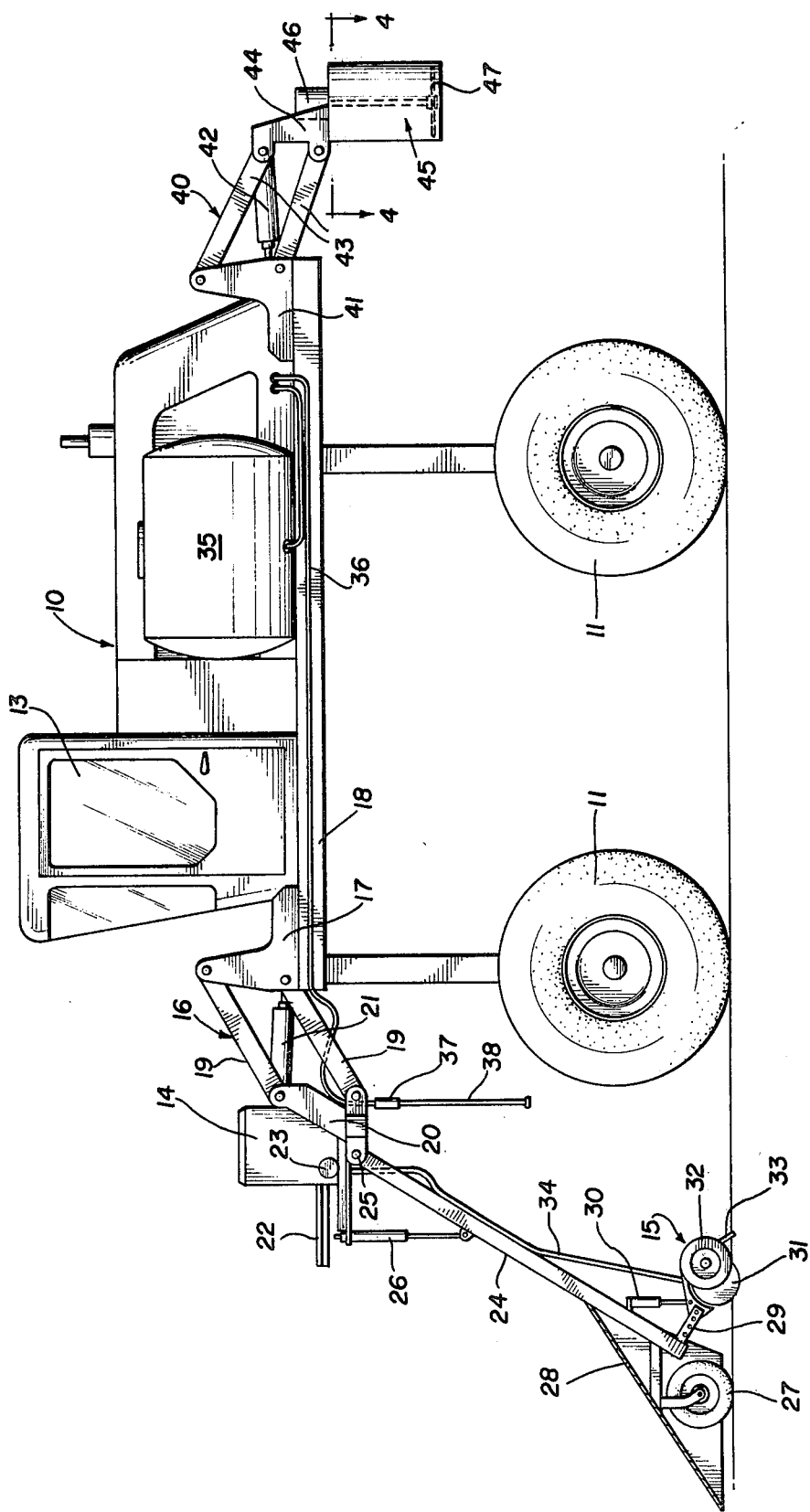
FIG. 2 is a side elevation of the same.

Referring to the drawings in detail wherein like numerals designate like parts throughout, the numeral 10 designates a high ground clearance tractor of the type capable of traversing rows of standing crops, such as corn. Such a tractor has a seven foot minimum ground clearance and each of its four wheels 11 are powered by hydraulic wheel motors indicated at 12 in FIG. 3. The steering of the tractor 10 is conventional and forms no part of this invention. The tractor further includes a clear visibility operator's cab 13, giving a clear view of a forward seed box and associated elements, to be described.

A transverse horizontal large seed box 14 common to the several planter units 15 of the machine which may be twelve in number across the front of the machine is mounted on a four point hitch mechanism 16 ahead of the cab 13 and including angle brackets 17 firmly attached to the tractor main frame 18. Parallel hitch links 19 support an always level support bracket 20 which carries the long seed box 14 extending for substantial distances equally on opposite sides of the tractor. The hitch bracket 20, seed box and associated elements are raised and lowered by a power cylinder 21 for the four point hitch.

Immediately forwardly of the seed box 14 is a convenience platform 22 fixed thereto at a proper height to be reached easily from the back of a seed supply truck. The usual fluted seed feed means, not shown, within the box 14 is operated by a hydraulic motor 23 at one end of the seed box, thus eliminating awkward ground driven chains, sprockets or the like.

Each pair of adjacent planter units 15 is carried by a long pivoted support arm 24 hinged at its top as shown at 25 to the support bracket 20. Yielding downward pressure is exerted on each support arm 24 by a spring device 26 interconnecting the arm 24 with bracket 20.

The bottom of each support arm 24 mounts a swiveled gage wheel 27 protected by a shield 28 adjustably mounted on the arm 24. Each pair of planter units 15 is carried by an adjustable pivot arm 29 connected to the back of support arm 24 and yieldingly biased downwardly by another spring device 30 to provide the proper pressure for the opening of seed furrows by twin forwardly converging opener discs 31 of each planter unit. Seed depth gage wheels 32 are also provided on each planter unit connected with one of the pivot arms 29 and behind each pair of discs 31 is a seed furrow coverer element 33.

Figure 3:
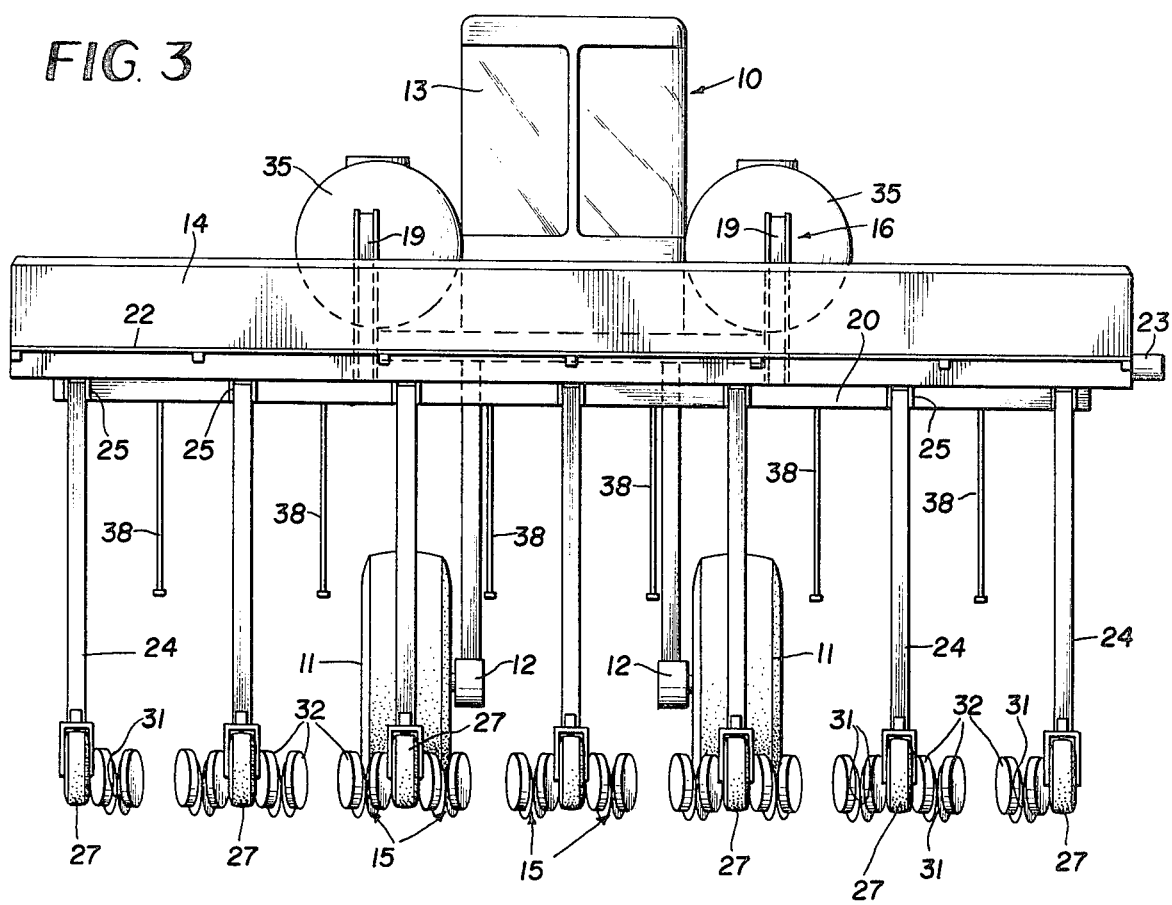
FIG. 3 is a front end elevation of the machine.
Figure 4:
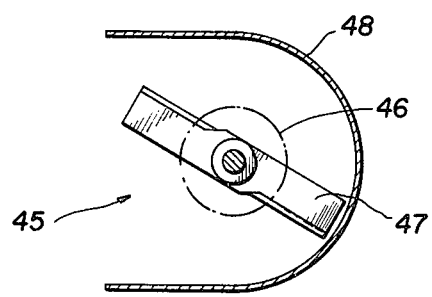
FIG. 4 is a horizontal section taken on line 4—4 of FIG. 2.

With reference to FIGS. 1 and 3, it can be noted that there is one independently suspended support arm 24 and one leading gage wheel 27 for each twin row planter unit 15 composed of two pairs of opener discs 31 and gage wheels 32 on opposite sides of support arm 24 and pivot arm 29 trailing from the support arm 24.

A flexible seed tube 34 at the rear of each arm 24 delivers seeds from the common box 14 to each planter unit 15. The hook-ups between the seed tubes and the seed box and planter units are conventional. The entire front planter apparatus can be elevated from the ground by means of the power cylinder 21 and four point hitch 16. As stated, each support arm 24 is floating or independently suspended and each twin row second crop planter unit 15 is independently floatingly supported through its pivot arm 29.

Twin large chemical spray tanks 35 are securely mounted on the tractor frame 18 above rear wheels 11 to counterbalance the weight of the planter apparatus. Feed lines 36 from these tanks deliver proper chemicals to a transverse horizontal common spray boom 37 immediately under the bracket 20 and having a depending flexible drop nozzle 38 connected therewith half way between each two rows of the existing or standing crop 39, FIG. 1. By this means, proper sprays may be delivered onto the newly planted seeds in their parallel pairs of rows between adjacent rows 39 of the first or existing crop, such as corn.

On the rear of tractor frame 18, a second four point hitch mechanism 40, substantially identical to the hitch 16, is provided including a fixed mounting bracket 41, power cylinder 42, links 43 and level support bracket 44. The hitch 40 is common to and supports a number of existing row crop trimming or topping units 45 corresponding in number and spacing to the rows 39 of the standing crop. Each topper unit 45 has a hydraulic drive motor 46 for its rotary topper blade 47 and a forwardly open U-shaped shield 48 fixed on the support bracket 44. The heights of the topper blades 47 are adjustable by use of the power cylinder 42. The trimmings or litter produced by topping the standing crop fall well behind the chemical spray applicator position so as not to interfere with the spraying operation. The purpose of topping the first crop is to allow more sunlight to reach the new or second crop and for more quickly drying the grain of the first crop.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A planting machine comprising a high ground clearance vehicle, power implement hitches on the forward and rear ends of such vehicle, a planter apparatus carried by the power implement hitch at the forward end of the vehicle, said planter apparatus comprising plural side-by-side planter assemblies, pivoted support arms independently suspending the planter assemblies from the forward power hitch, a seed box common to the planter assemblies on the forward power hitch, and gage wheels on the lower ends of said support arms, standing row crop topper units carried by said rear power hitch in laterally spaced relationship, and a row crop sprayer means on said vehicle including a spray boom common to the planter assemblies and plural depending spray nozzles rearwardly of the planter assemblies at an elevation thereabove and well forwardly of the topper units.

2. A planting machine as defined in claim 1, and the power implement hitches including parallelogram linkages for leveling the implements carried thereby at various elevations.

3. A planting machine as defined in claim 1, and a horizontal seed loading platform immediately forwardly of the seed box and extending along the seed box and across said planter assemblies and being fixed to the implement hitch on the forward end of the vehicle.

4. A planting machine as defined in claim 1, and said row crop topper units on the rear power hitch comprising plural independently operated vertical axis horizontally rotating blade cutters.

5. A planting machine as defined in claim 1, and said sprayer means further comprising chemical spray tanks on opposite sides of said vehicle between said power hitches and serving to balance and distribute the weight of the machine evenly on the wheels thereof.

6. A planting machine as defined in claim 1, and said depending spray nozzles comprising elongated flexible nozzles centered laterally between adjacent rows of existing crops between which rows of a second crop are being planted.

7. A planting machine as defined in claim 1, and each planter assembly further comprising twin row planting means on each support arm and a vertically swingable pivot arm interconnecting each support arm with each twin row planting means whereby such means floatingly trails the support arm.

8. A planting machine as defined in claim 7, and a downwardly active spring pressure means coupled between each support arm and its associated vertically swingable pivot arm to yieldingly bias each twin row planting means toward the ground.

9. A planting machine as defined in claim 8, and each twin row planting means including a double disc furrow opener and a seed depth gage wheel on the vertically swingable pivot arm.

10. A planting machine as defined in claim 9, and a seed covering element at the rear end of each twin row planting means.

11. A planting machine as defined in claim 1, and spring pressure means coupled between each pivoted support arm and the implement hitch on the forward end of the vehicle to independently resiliently bias each support arm toward the ground.

12. A planting machine as defined in claim 11, and a swiveled ground-engaging gage wheel on the lower end of each support arm.

13. A planting machine as defined in claim 12, and a forwardly tapering inclined adjustable shield for the swiveled gage wheel on each support arm.

* * * * *